United States Patent
Kawatsu et al.

(10) Patent No.: US 6,572,786 B2
(45) Date of Patent: Jun. 3, 2003

(54) PHOSPHOR AND FLUORESCENT DISPLAY DEVICE

(75) Inventors: Kuniaki Kawatsu, Mobara (JP); Toshinori Suzuki, Mobara (JP); Chiyuki Hayakawa, Mobara (JP)

(73) Assignee: Futuba Corporation, Chiba-ken (JP)

( * ) Notice: Subject to any disclaimer, the term of this patent is extended or adjusted under 35 U.S.C. 154(b) by 0 days.

(21) Appl. No.: 09/839,408

(22) Filed: Apr. 23, 2001

(65) Prior Publication Data

US 2001/0032971 A1 Oct. 25, 2001

(30) Foreign Application Priority Data

Apr. 25, 2000 (JP) ......................... 2000-124593

(51) Int. Cl.$^7$ .................. C09K 11/54; C09K 11/56; C09K 11/62; G02B 5/20; G05D 5/06
(52) U.S. Cl. .................. 252/301.6 R; 252/301.4 R; 252/301.6 S; 252/301.4 S; 252/584
(58) Field of Search ............... 252/301.4 R, 301.6 R, 252/301.6 S, 301.4 S, 301.36, 700, 301.33, 584

(56) References Cited

U.S. PATENT DOCUMENTS

| | | | | |
|---|---|---|---|---|
| 4,020,231 A | * | 4/1977 | Hedler et al. | 428/403 |
| 4,375,373 A | * | 3/1983 | Abe et al. | |
| 4,393,118 A | * | 7/1983 | Marshall et al. | 428/403 |
| 4,398,119 A | * | 8/1983 | Dodds et al. | 313/466 |
| 4,473,634 A | * | 9/1984 | Dodds et al. | 430/272 |
| 4,684,540 A | * | 8/1987 | Schulze | 427/71 |
| 4,695,478 A | * | 9/1987 | Schulze et al. | 427/71 |
| 4,699,662 A | * | 10/1987 | Nakada et al. | 106/287.13 |
| 4,717,590 A | * | 1/1988 | Wolfe et al. | 427/68 |
| 4,859,497 A | * | 8/1989 | Wolfe et al. | 427/68 |
| 5,041,334 A | * | 8/1991 | Nakajima et al. | 428/407 |
| 5,246,781 A | * | 9/1993 | Jeong | 428/407 |
| 5,670,086 A | * | 9/1997 | Papadopoulos et al. | 252/301.4 P |
| 5,922,395 A | * | 7/1999 | Koike et al. | 427/68 |

FOREIGN PATENT DOCUMENTS

| | | | |
|---|---|---|---|
| JP | 5-209173 | * | 8/1993 |
| WO | WO 01/98433 A1 | * | 12/2001 |

OTHER PUBLICATIONS

Derwent–Acc–No.: 1993–297890.*

* cited by examiner

Primary Examiner—Joseph D. Anthony
(74) Attorney, Agent, or Firm—Breiner & Breiner, L.L.C.

(57) ABSTRACT

A phosphor capable of preventing a deterioration in luminous characteristics thereof, particularly, high-temperature operation characteristics thereof due to a $SiO_2$-containing pigment added thereto. The phosphor has a pigment contained therein, wherein the pigment has $SiO_2$ added thereto and is melted, to thereby be coated with sodium glass. This permits gas generated during operation of the phosphor to be adsorbed on the phosphor as compared with a conventional phosphor to which the pigment subjected to the above-described treatment is not added, resulting in luminance retention of the phosphor after operation thereof being increased. In particular, it permits characteristics of the non-driven phosphor after the high-temperature operation test to be enhanced.

3 Claims, 5 Drawing Sheets

PHOSPHOR AND FLUORESCENT DISPLAY DEVICE

BACKGROUND OF THE INVENTION

This invention relates to a phosphor, and more particularly to a phosphor having a pigment of a specific color added thereto in order to extract a specific wavelength from luminous colors.

A phosphor containing 15% of $CoAl_3O_4$ acting as a blue pigment and 85% of ZnO:Zn acting as a phosphor material which are mixed each other is known in the art as disclosed in Japanese Patent Application Laid-Open Publication No. 71982/1983. The phosphor disclosed exhibits a luminous color shifted to a side of a blue color as compared with a phosphor consisting of only the ZnO:Zn phosphor material.

The conventional phosphor described above was subjected to a high-temperature operation test. As a result, unfortunately it was found that the high temperature operation causes the non-driven phosphor or phosphor which was not driven for luminescence during the operation to be highly deteriorated to a degree of failing to permit the phosphor to be put to practical use.

More specifically, in the high-temperature operation test, the phosphor was continuously subjected to the test for 20 hours in an atmosphere at 85° C. and then luminance retention (L level) of the phosphor was measured after the test. As a result, supposing that initial luminance of the phosphor is 100%, the driven phosphor or phosphor which was driven for display or luminescence exhibited an L level of 90% or more which is above a standard level of 80% or more. However, the non-driven phosphor which was not driven for luminescence or subjected to luminescence during the test exhibited an L level as low as 50% below the standard level. The term "phosphor which was not driven for luminescence", "phosphor which was not subjected to driving for luminescence" or "non-driven phosphor" used herein indicates the phosphor which was not continuously driven for luminescence during test period over, for example, 20 hours in the test. Instead, the non-driven phosphor was driven for luminescence after a lapse of the test time and then luminance retention thereof was measured.

The inventors considered reasons why the non-driven phosphor is reduced in luminance. First, it was supposed that a deterioration in the non-driven phosphor is due to the fact that any substance is discharged from the phosphor being driven for luminescence (driven phosphor) due to impingement of electrons thereon and then adhered to the non-driven phosphor. In order to ascertain whether such supposition is correct, it was examined whether a blue pigment added to the phosphor contains any substance which is apt to be outwardly discharged therefrom. As a result of various attempts, the following fact was found. More particularly, 1 g of the blue pigment was added to 70 g of pure water to prepare a mixture, which was then stirred to obtain a solution. Then, the amount of a sodium ion ($Na^+$) in the solution was measured by means of a pH meter. As a result, the sodium ion was detected in an amount of 80 to 90 ppm even when the blue pigment was added to pure water after being washed. This would be due to the fact that the pigment readily causes liberation of $Na^+$ because in general the pigment is alkaline and contains plenty of Na. Thus, when the ZnO:Zn phosphor having the pigment mixedly added thereto is driven for luminescence in the high-temperature test, electrons impinged on the driven pigment causes $Na^+$ to be emitted therefrom, resulting in the $Na^+$ being adhered to the non-driven phosphor. This leads to a deterioration in the non-driven phosphor.

SUMMARY OF THE INVENTION

The present invention has been made in view of the foregoing disadvantage of the prior art.

Accordingly, it is an object of the present invention to provide a phosphor which is capable of preventing a deterioration in luminous characteristics of the phosphor, particularly, high-temperature operation characteristics thereof due to a pigment contained therein.

In accordance with one aspect of the present invention, a phosphor is provided. The phosphor has a neutral pigment adhered thereto.

In a preferred embodiment of the present invention, the neutral pigment is prepared by melting a mixture obtained by adding $SiO_2$ to an alkaline pigment.

In a preferred embodiment of the present invention, $SiO_2$ is added to the alkaline pigment in an amount of 0.1 to 10 wt. % based on the alkaline pigment.

In a preferred embodiment of the present invention, the phosphor is selected from the group consisting of a ZnS phosphor, a ZnCdS phosphor, and a $ZnGa_2O_4$ phosphor. The alkaline pigment is selected from the group consisting of Ti—Sb—Ni, Co—Al—Cr—Ti, Ti—Zn—Ni—Co and Co—Al.

In accordance with this aspect of the present invention, a phosphor is provided. The phosphor has a pigment having a surface coated with glass added thereto.

In accordance with another aspect of the present invention, a fluorescent display device is provided. The fluorescent display device includes the phosphor described above.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
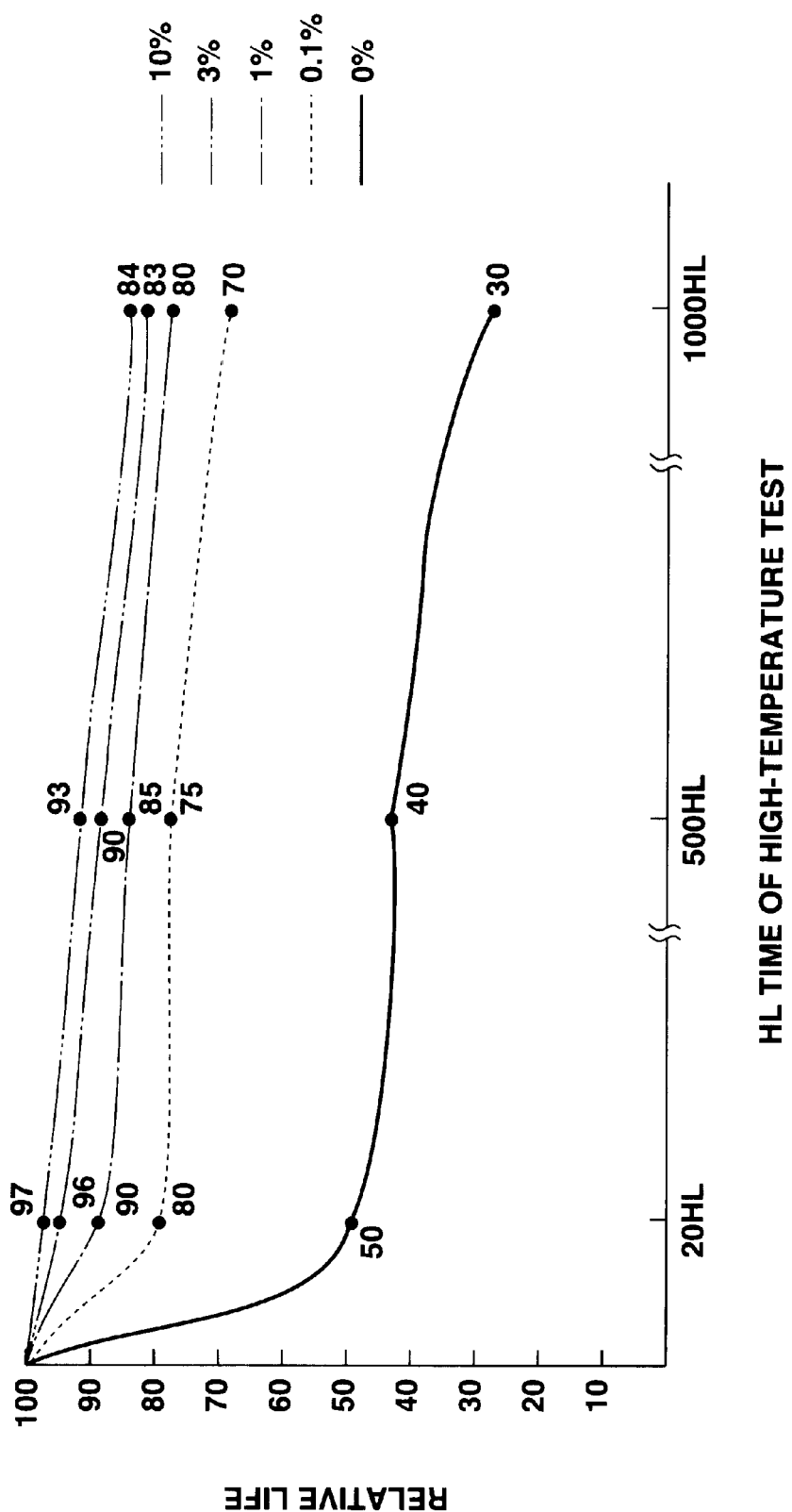
FIG. 1 is a graphical representation showing results of a high-temperature operation test carried out in an embodiment of the present invention in which the amount of $SiO_2$ added is considered to be a parameter, wherein an axis of abscissae indicates test time and an axis of ordinates incidates luminance retention supposing that initial luminance is 100.

Now, a phosphor according to the present invention will be described with reference to the accompanying drawings.

In order to prevent plenty of Na contained in an alkaline pigment from being outwardly discharged therefrom due to impingement of electrons thereon, the inventors reached a conception that the alkaline pigment is added to a phosphor while rendering Na hard to liberate from the alkaline pigment. In addition, as a result of further proceeding the study, the inventors found the fact that vitrification of Na which is carried out by melting a pigment having $SiO_2$ added thereto at a predetermined temperature is effective as a means of rendering liberation of Na from the pigment difficult or hard.

More particularly, the inventors carried out an experiment, wherein a blue pigment $CoAl_2O_4$ having $SiO_2$ added thereto was melted at a temperature of 900 to 1500° C. Then, the above-described procedure applied to the conventional pigment was substantially repeated on the blue pigment of the present invention. More specifically, the pigment was placed in pure water and then the amount of $Na^+$ in the water was measured by means of a pH meter. As a result, it was found that the water contains $Na^+$ at a concentration as low as 0 ppm and several ppm. This indicates that $Na^+$ hardly elutes from the pigment into pure water.

This would be due to the fact that melting of the pigment having $SiO_2$ added thereto leads to production of stable sodium glass. It is known that melting of a mixture between $SiO_2$ and NaCl for 30 to 90 minutes at a temperature of 1400 to 1500° C. leads to production of $NaSiO_2$ (sodium glass). It is considered that a similar reaction takes place in melting of the above-described pigment having $SiO_2$ added thereto.

The blue pigment thus produced permits a sodium ingredient thereof to be vitrified, to thereby render it hard to elute from the pigment. This, when the pigment is added to the phosphor of the present invention for the purpose of shifting a luminous spectrum of the phosphor to a side of a blue luminous color, likewise prevents the non-driven phosphor which was not driven for luminescence from being deteriorated in luminance or reduced in luminance retention after high-temperature operation.

Now, advantages of the phosphor of the present invention will be described with reference to data obtained by an experiment. In the experiment, $SiO_2$ was added to the blue pigment $CoAl_3O_4$ to prepare a mixture, which was then melted in substantially the same manner as described above, to thereby substantially restrain Na from eluting from the pigment. Then, the pigment was added to a ZnO:Zn phosphor material to obtain a phosphor. It was found that a particle diameter of $SiO_2$ within a range between 0.1 $\mu$m and 5 $\mu$m does not cause any significant variation or difference between data obtained. Thus, a plurality of phosphors having $SiO_2$ added in amounts different from each other were prepared for a high-temperature operation test. Results were as shown in FIGS. 1 to 3.

FIG. 1 shows results of the high-temperature operation test in which the amount of $SiO_2$ added to the pigment is considered to be a parameter, wherein an axis of abscissae indicates test time and an axis of ordinates indicates luminance retention supposing that initial luminance of the phosphor is 100. As will be noted from FIG. 1, supposing that the amount of $SiO_2$ added is constant, an increase in test time led to a deterioration or reduction in luminance retention of the phosphor. However, in the phosphor of the present invention containing the pigment to which $SiO_2$ was added in an amount of 0.1% or more, an increase in test time did not lead to a rapid reduction in luminance retention to a degree sufficient to adversely affect practical use thereof. For example, even when $SiO_2$ was added in an amount of 0.1% which leads to a maximum reduction in luminance retention, the luminance retention of the phosphor after the test of 1000 hours was kept at a level as high as about 70%. On the contrary, in the conventional phosphor containing the pigment to which $SiO_2$ is not added, luminance retention was abruptly reduced to a level as low as about 50% when test time exceeded 20 hours or thereabouts. Also, the luminance retention was substantially reduced to a level as low as about 30% after 1000 hours.

Figure 2:
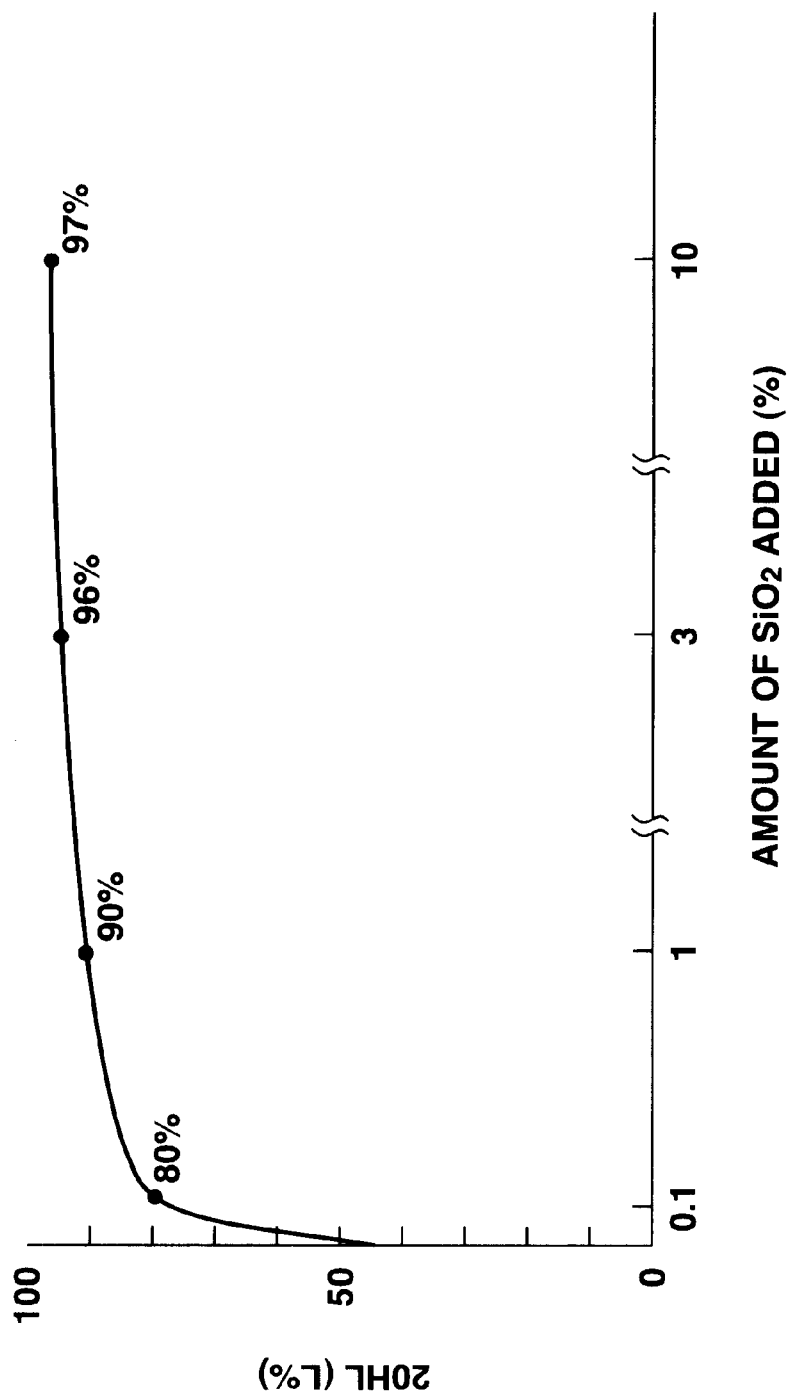
FIG. 2 is a graphical representation showing results of a high-temperature operation test carried out over 20 hours in an embodiment of the present invention, wherein an axis of ordinates indicates relative luminance and an axis of abscissae indicates the amount of $SiO_2$ added.

FIG. 2 shows results of the high-temperature operation test carried out over 20 hours, wherein an axis of ordinates indicates relative luminance of the phosphors and an axis of abscissae indicates the amount of $SiO_2$ added. As will be noted from FIG. 2 as well, in the conventional phosphor containing the pigment to which $SiO_2$ was not added, relative luminance thereof after the high-temperature operation test over 20 hours was caused to be reduced to a level as low as 50%. The phosphor of the present invention containing the pigment to which $SiO_2$ was added in an amount of 0.1% or more permitted the relative luminance to be kept at a level as high as 80% or more, to thereby be suitable for practical use.

Figure 3:
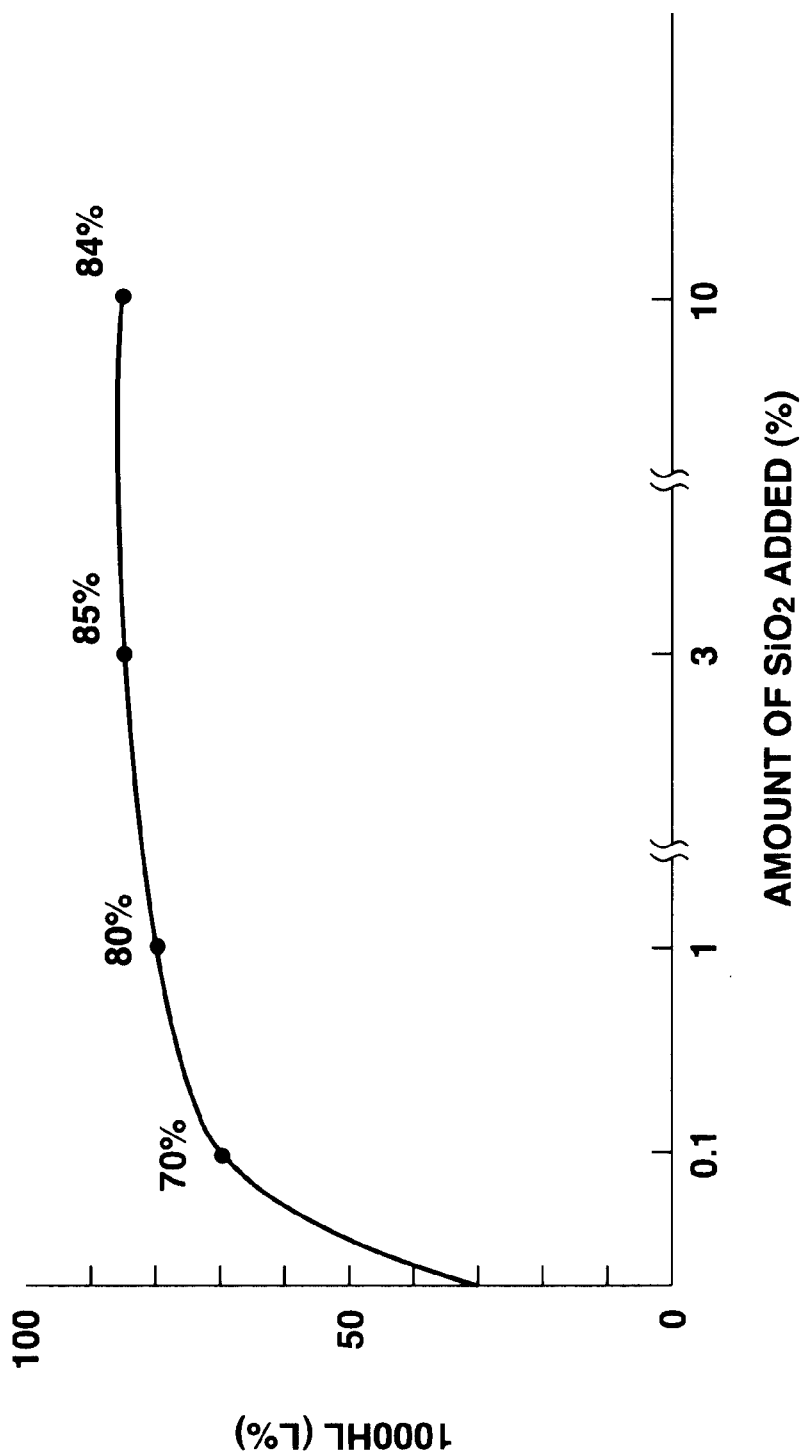
FIG. 3 is a graphical representation showing results of a high-temperature operation test carried out over 1000 hours in an embodiment of the present invention, wherein an axis of ordinates indicates relative luminance and an axis of abscissae indicates the amount of $SiO_2$ added.

FIG. 3 shows results of the high-temperature operation test carried out over 1000 hours, wherein an axis of ordinates indicates relative luminance of the phosphors and an axis of abscissae indicates the amount of $SiO_2$ added. As will be noted from FIG. 3 as well, in the conventional phosphor to which $SiO_2$ was not added, relative luminance thereof after the high-temperature operation test over 100 hours was caused to be reduced to a level as low as 30%. The phosphor of the present invention containing the pigment to which $SiO_2$ was added in an amount of 0.1% or more permitted the relative luminance to be kept at a level as high as 60% or more, to thereby be suitable for practical use.

Further, the experiment by the inventors revealed that addition of $SiO_2$ to the pigment in an amount above 10% causes the phosphor to be deteriorated in initial luminance.

Now, the amount of $SiO_2$ added to the pigment which permits the phosphor to exhibit the above-described advantage will be considered in view of the data described above. First, in order to ensure that the phosphor exhibits luminance which is sufficient to permit it to be put to practical use, the amount of $SiO_2$ to be added to the pigment is preferably 10% or less. Also, the amount of $SiO_2$ below 0.1% fails to permit the phosphor to exhibit satisfactory luminance retention after the high-temperature operation test. Thus, the amount of $SiO_2$ to be added to the pigment is preferably within a range between 0.1% and 10%.

Figure 4:
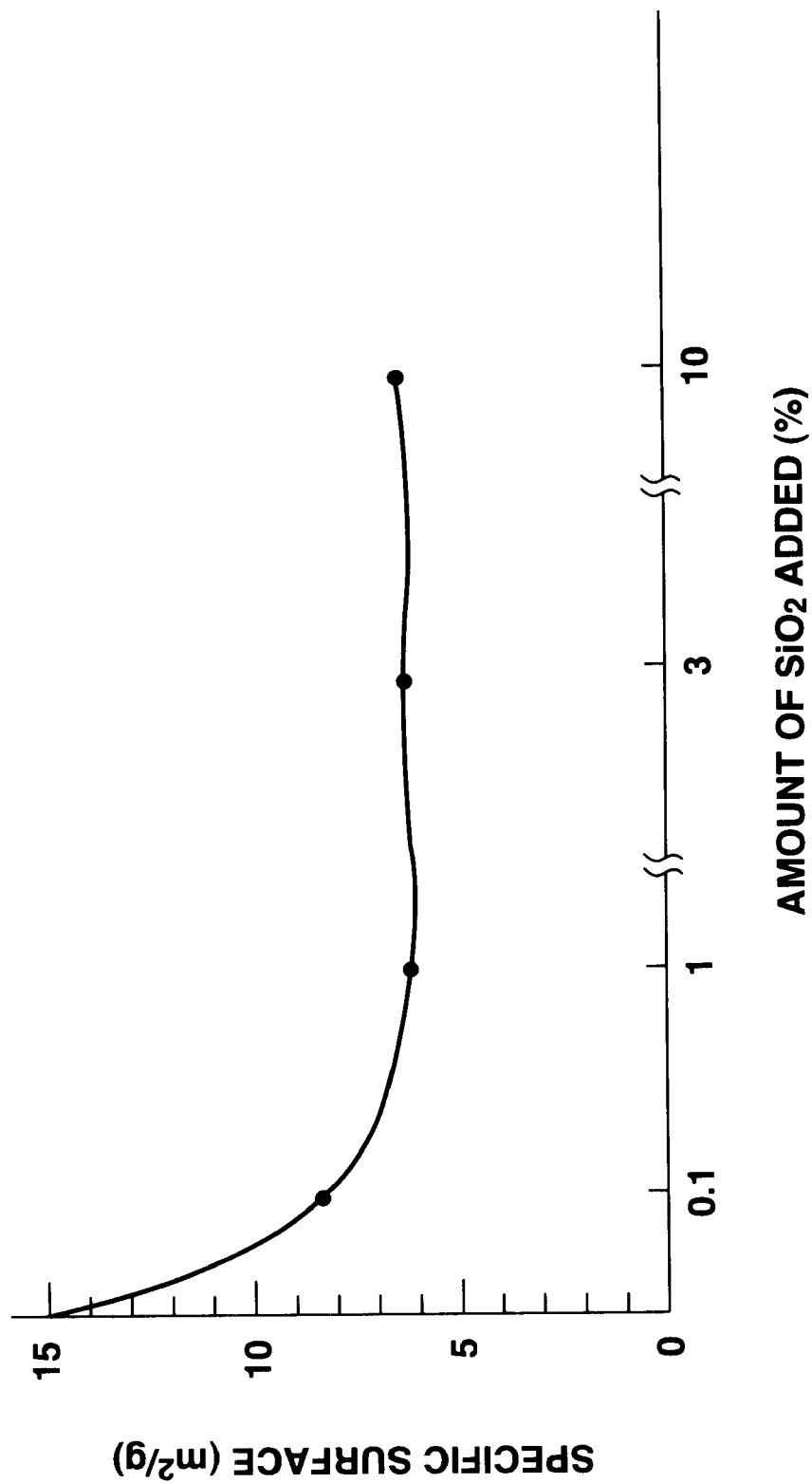
FIG. 4 is a graphical representation showing characteristics of a $SiO_2$-added pigment manufactured according to an embodiment of the present invention, wherein an axis of abscissae indicates the amount of $SiO_2$ added and an axis of ordinates indicates specific surface ($m^2/g$)

Now, reasons why the phosphor of the present invention having the pigment incorporated therein exhibits the above-described advantage will be considered in view FIG. 4 which shows characteristics of the $SiO_2$-added pigment manufactured according to the present invention, wherein an axis of abscissae indicates the amount of $SiO_2$ added to the pigment and an axis of ordinates indicates a specific surface ($m^2/g$) of the pigment. As will be noted from FIG. 4, the conventional pigment or pigment to which $SiO_2$ is not added is caused to have a specific surface as large as 15 $m^2/g$, whereas addition of $SiO_2$ to the pigment permits a substantial reduction in specific surface. More specifically, the pigment having $SiO_2$ added thereto in an amount 0.1% or more is permitted to have a specific surface of about 8 $m^2/g$ which is about one half as large as that of the conventional pigment. Also, the amount of $SiO_2$ above 1% causes the specific surface to be about 6 $m^2/g$ which is a saturation value. Thus, a reduction in specific surface of the pigment by addition of $SiO_2$ to the pigment would be due to the fact that sodium ions (Na+) vitrify, to thereby cover a surface of particles of the pigment.

Figure 5:
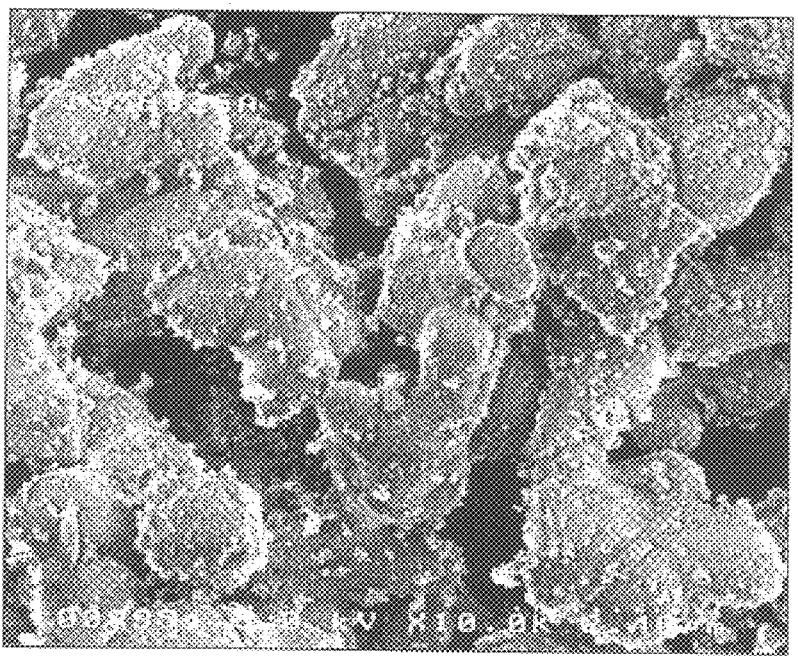
FIG. 5 is an electron microscope photograph showing a conventional pigment.
Figure 6:
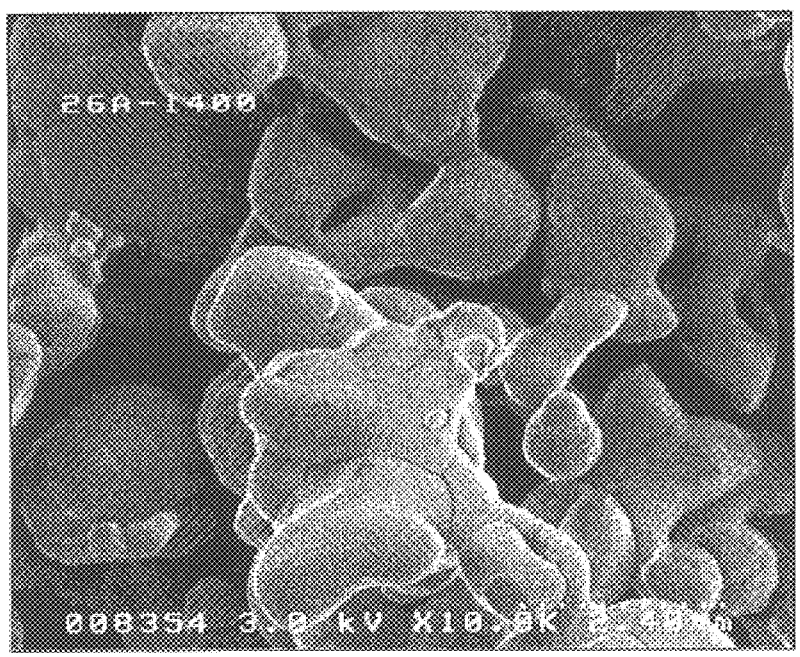
FIG. 6 is an electron microscope photograph showing a $SiO_2$-added pigment manufactured according to an embodiment of the present invention.

FIG. 5 is an electron microscope photograph showing a structure of the conventional pigment from which addition of $SiO_2$ thereto, and heating and melting thereof are excluded, whereas FIG. 6 shows an electron microscope photograph showing a structure of the pigment of the present invention wherein addition, heating and melting of $SiO_2$ were carried out. As will be understood from comparison in surface conditions of particles between the pigments shown in FIGS. 5 and 6, particles of the present pigment have a surface coated with a material which is considered to be sodium glass, to thereby be smoothed. This results in sodium contained in the pigment being hard to elute therefrom.

As described above, the pigment of the present invention which had $SiO_2$ added thereto, and were heated and melted permits a surface thereof to be coated with sodium glass, resulting in a specific surface thereof being reduced, leading to a decrease in adsorption of gas thereon. Thus, incorporation of the phosphor of the present invention having the $SiO_2$-containing pigment added thereto in a luminous device permits various kinds of gas produced during luminous operation of the device to be hard to adsorb on the pigment in the phosphor, to thereby increase luminance retention as compared with the conventional pigment-added phosphor, leading to an improvement in display characteristics of the luminous device.

Such an advantage contributes to not only an improvement in characteristics of the phosphor which is subjected to driving for luminescence after high-temperature operation, but an improvement in characteristics of the driven phosphor.

The above description has been made in connection with the ZnO:Zn phosphor including the blue pigment $CoAl_3O_4$ which has $SiO_2$ added thereto and is then melted. However, a combination of a phosphor material and a pigment in the present invention is not limited to the above. For example, the present invention may be effectively applied to a combination between a blue pigment Ti—Sb—Ni and a phosphor material (Zn,Cd)S:Au,Al, that between a brown pigment Co—Al—Cr—Ti and a phosphor material (Zn,Cd)S:Ag, that between a green pigment Ti—Zn—Ni—Co and a phosphor material ZnO:Zn, that between a blue pigment Co—Al and a phosphor material ZnO:Zn, and the like.

Also, phosphor materials which exhibit the above-described advantages due to addition of the $SiO_2$-added pigment thereto include ZnS phosphor materials (ZnS:Ag, ZnS:Cu,Al and the like), ZnCdS phosphor materials ($ZnCd_{0.2}S_{0.8}$:Ag and the like), and $ZnGa_2O_4$ phosphor materials ($ZnGa_2O_4$:Mn and the like).

As can be seen from the foregoing, the phosphor of the present invention includes the phosphor material and the pigment added thereto, wherein the pigment has $SiO_2$ added thereto and is melted, to thereby be coated with sodium glass. Such construction reduces adsorption of gas on the phosphor as compared with the conventional phosphor to which the pigment subjected to the above-described treatment is not added, resulting in luminance retention of the phosphor after operation thereof being increased. In particular, it permits characteristics of the non-driven phosphor after the high-temperature operation test to be enhanced.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A phosphor comprising a ZnO:Zn or $ZnGa_2O_4$ phosphor having deposited thereon an alkaline pigment coated with $SiO_2$, wherein said alkaline pigment coated with said $SiO_2$ is provided by a mixture of said $SiO_2$ having a particle diameter of 0.1–5 μm and said alkaline pigment, said mixture having been melted at a temperature of 900–1500° C.

2. A phosphor as claimed in claim 1 wherein said $SiO_2$ is present in said mixture in an amount of 0.1 to 10 wt. % based on said alkaline pigment.

3. A phosphor as claimed in claim 1 wherein said alkaline pigment is selected from a group consisting of Ti—Zn—Ni—Co and Co—Al.

* * * * *